United States Patent
Lee et al.

(10) Patent No.: US 8,754,945 B2
(45) Date of Patent: Jun. 17, 2014

(54) IMAGE CAPTURING DEVICE AND MOTION TRACKING METHOD

(75) Inventors: Hou-Hsien Lee, Tu-Cheng (TW);
Chang-Jung Lee, Tu-Cheng (TW);
Chih-Ping Lo, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 486 days.

(21) Appl. No.: 13/110,007

(22) Filed: May 18, 2011

(65) Prior Publication Data

US 2012/0086809 A1    Apr. 12, 2012

(30) Foreign Application Priority Data

Oct. 12, 2010   (TW) ................................ 99134814 A

(51) Int. Cl.
*H04N 7/18*    (2006.01)
(52) U.S. Cl.
USPC ........................................................ 348/155
(58) Field of Classification Search
USPC ........................................................ 348/155
See application file for complete search history.

(56) References Cited

U.S. PATENT DOCUMENTS

| 2009/0201380 A1* | 8/2009 | Peaslee et al. | 348/208.4 |
| 2010/0246925 A1* | 9/2010 | Nagatsuka et al. | 382/132 |
| 2011/0052045 A1* | 3/2011 | Kameyama | 382/154 |

FOREIGN PATENT DOCUMENTS

| CN | 19803984 A | 6/2007 |
| CN | 101080003 A | 11/2007 |
| CN | 201577131 U | 9/2010 |

* cited by examiner

*Primary Examiner* — Dave Czekaj
*Assistant Examiner* — Tracy Li
(74) *Attorney, Agent, or Firm* — Novak Druce Connolly Bove + Quigg LLP

(57) ABSTRACT

In a motion tracking method using an image capturing device that is installed on a track system, images of a monitored area are captured in real-time using a lens of the image capturing device. The captured images are analyzed to check for motion in the monitored area, and a movement direction of the motion is determined when the motion is detected in the monitored area. The image capturing device is controlled to move along the track system to track the motion using a driving device according to the movement direction.

15 Claims, 8 Drawing Sheets

IMAGE CAPTURING DEVICE AND MOTION TRACKING METHOD

BACKGROUND

1. Technical Field

Embodiments of the present disclosure relate generally to surveillance technology, and more particularly, to an image capturing device and a motion tracking method using the image capturing device.

2. Description of Related Art

Cameras installed on a track system have been used to perform security surveillance by capturing images of a monitored area. A typical camera installed on the track system can automatically and can regularly move along the track system but cannot move according to specific movements.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
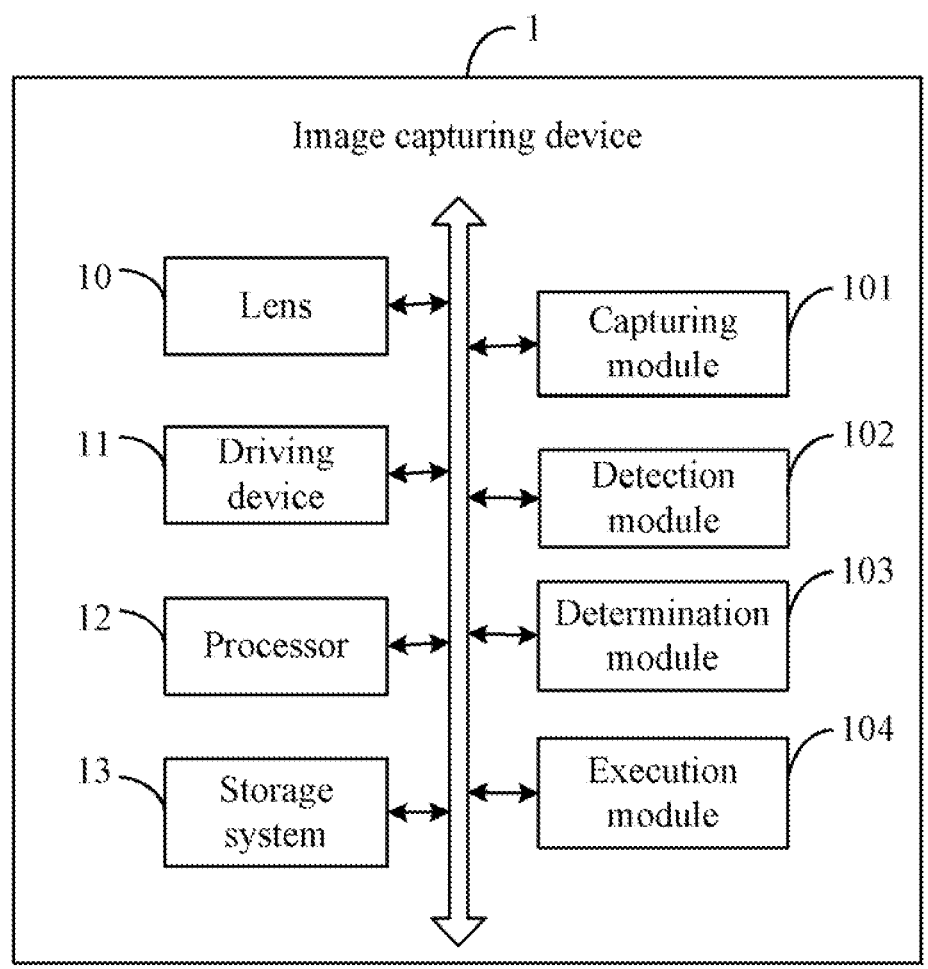
FIG. 1 is a block diagram of one embodiment of an image capturing device.

FIG. 1 is a block diagram of one embodiment of an image capturing device 1. In the embodiment, the image capturing device 1 includes a lens 10, a driving device 11, a processor 12, and a storage system 13. The image capturing device 1 may further include a capturing module 101, a detection module 102, a determination module 103, and an execution module 104. It should be apparent that FIG. 1 is only one example of the image capturing device 1 that can be included with more or fewer components than shown in other embodiments, or a different configuration of the various components.

Each of the modules 101-104 may include one or more computerized instructions in the form of one or more programs that are stored in the storage system 13 or a computer-readable medium, and executed by the processor 12 to perform operations of the image capturing device 1. In general, the word "module", as used herein, refers to logic embodied in hardware or firmware, or to a collection of software instructions, written in a programming language, such as, Java, C, or Assembly. One or more software instructions in the modules may be embedded in firmware, such as EPROM. The modules described herein may be implemented as either software and/or hardware modules and may be stored in any type of computer-readable medium or other storage device.

Figure 2:
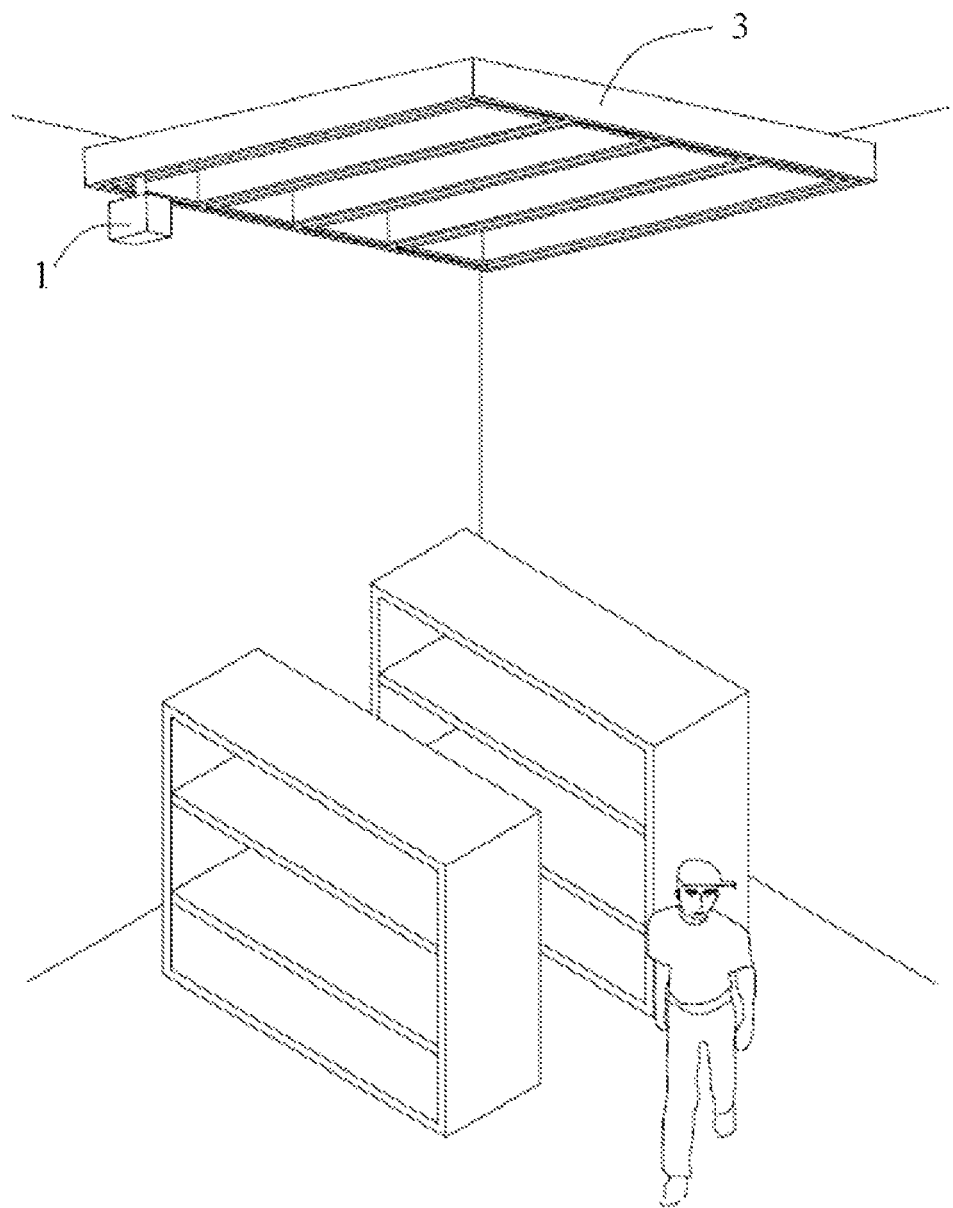
FIG. 2 is a schematic diagram illustrating one example of the image capturing device installed on a track system.
Figure 3A:
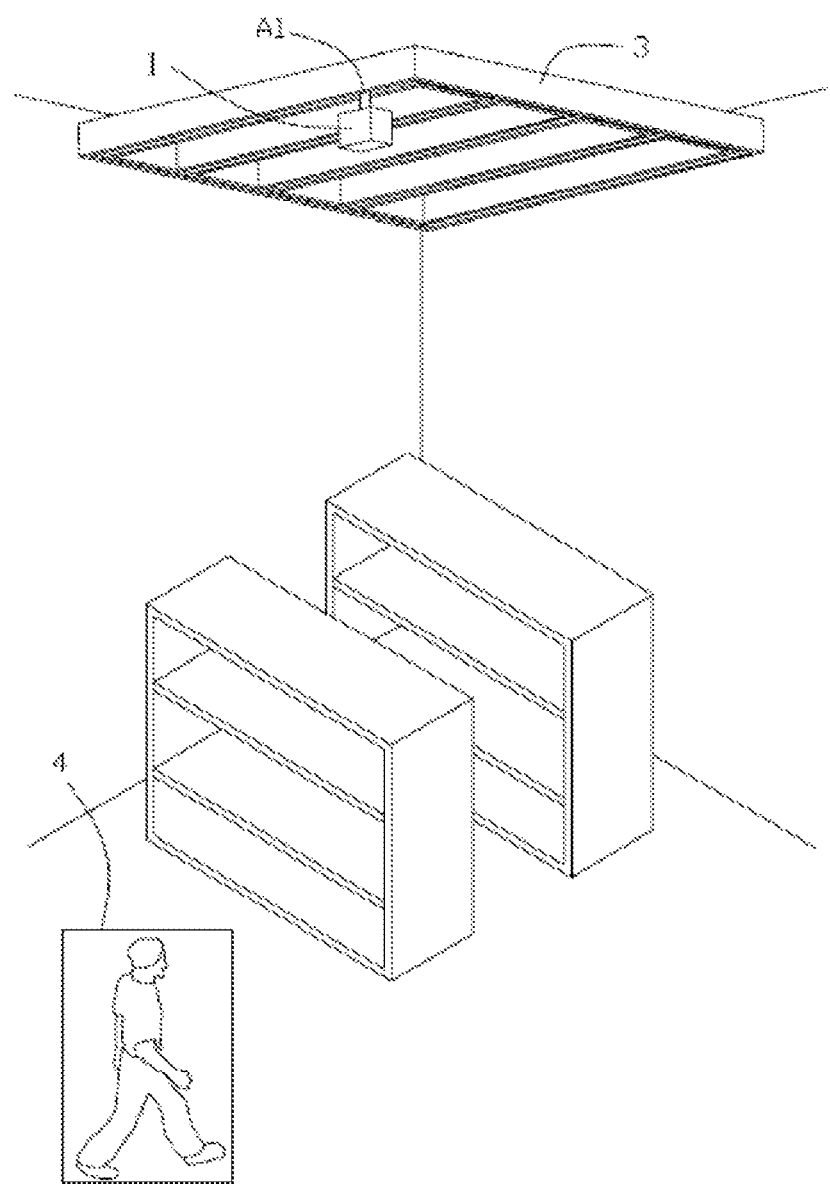
FIGS. 3A-3C are schematic diagrams of one embodiment of controlling movements of the image capturing device along the track system according to a specific motion.
Figure 3B:
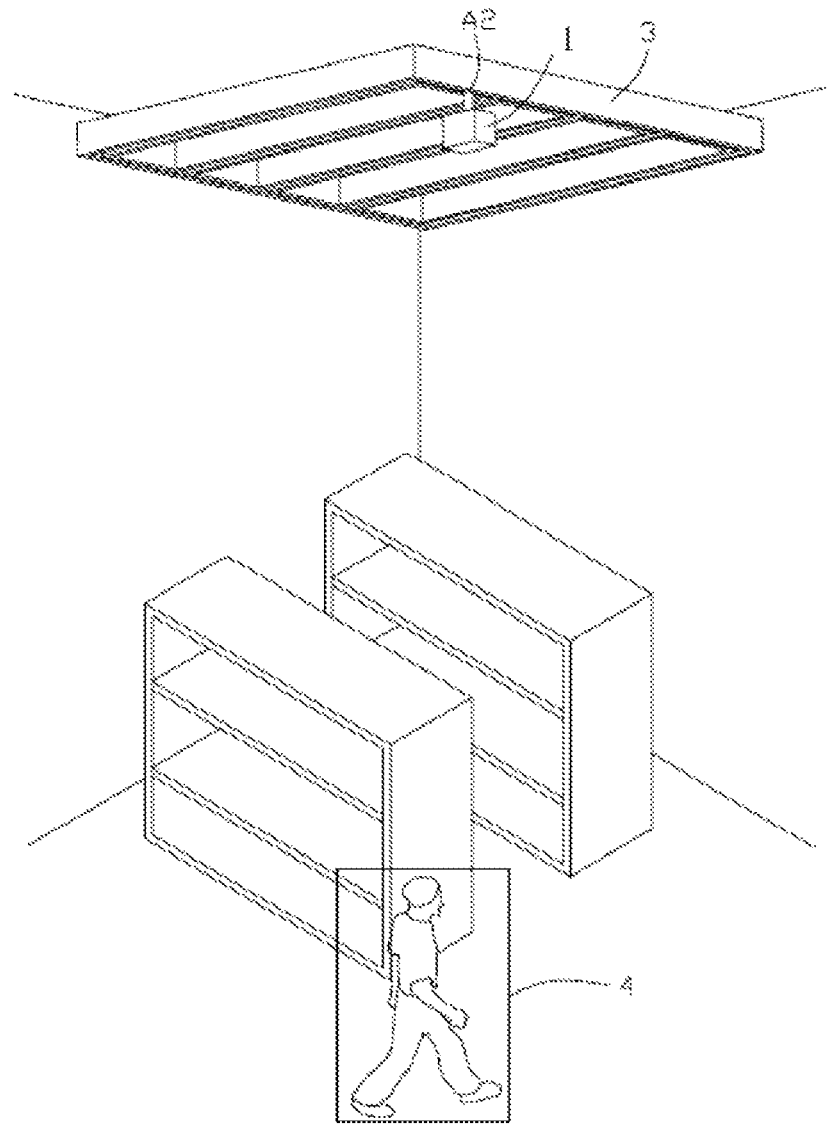
Figure 3C:
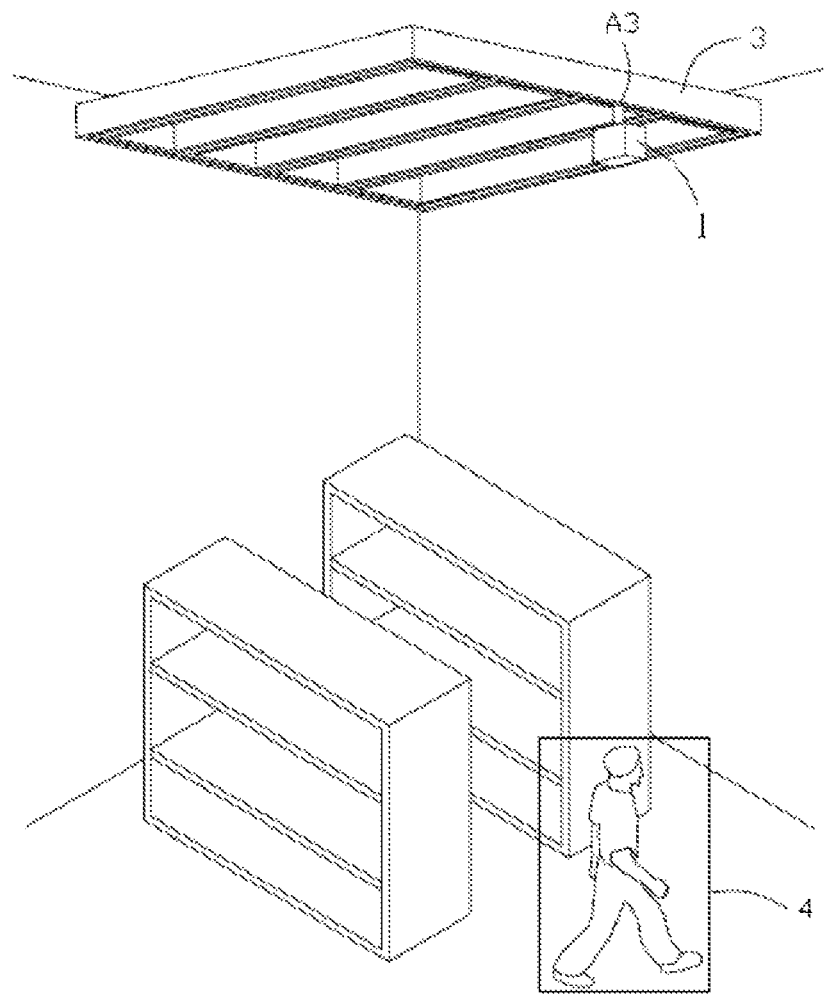

Referring to FIG. 2, the image capturing device 1 is installed on a track system 3. The track system 3 comprises one or more tracks, and the image capturing device 1 can be controlled to move along the tracks according to a specific motion that is detected in a monitored area, such as movements of people. In one embodiment, the image capturing device 1 may be a speed dome camera or a pan/tilt/zoom (PTZ) camera, for example. The track system 3 may be installed on the top of the monitored area or other suitable locations.

The lens 10 may include a charge coupled device (CCD) for capturing images of the monitored area. The monitored area may be the interior of a warehouse, a supermarket, a bank, or other place to be monitored. The driving device 11 may be used to drive the image capturing device 1 to move along the tracks of the track system 3. In one embodiment, the driving device 11 may be composed of one or more servo motors.

The capturing module 101 is operable to capture images of the monitored area using the lens 10 in real-time. In the embodiment, the capturing module 101 may capture an image of the monitored area at regular intervals, such as, one second, or two seconds.

The detection module 102 is operable to analyze the captured images to check for motion in the monitored area. In the embodiment, the motion may be defined as movements of people in the monitored area. The captured images are two dimension (2D) images. The detection module 102 may use a 2D image analysis method to analyze the images. In one embodiment, the 2D image analysis method may be a template matching method using a neural network training algorithm or an adaptive boosting (AdaBoost) algorithm. A detailed description is provided as follows.

The detection module 102 may compare each of the captured images with a plurality of 2D templates of people to check for a region that is the same as or similar to any one of the templates. In the embodiment, the 2D templates of people may be pre-collected and stored in the storage system 13. When a region that is checked is the same or similar to any one of the templates, a person is detected in the monitored area. Then the detection module 102 extracts the region from one of the captured images of the monitored area in which the person is detected.

The determination module 103 is operable to determine a movement direction of the motion when the motion is detected in the monitored area. In the embodiment, the determination module 103 may determine the movement direction of the motion by comparing positions of the motion within two images of the monitored area consecutively captured by the lens 10.

The execution module 104 is operable to control the image capturing device 1 to move along the track system 3 to track the motion according to the movement direction using the driving device 11. For example, if a person moves towards the left of the monitored area, the execution module 104 may control the image capturing device 1 to move towards the left of the track system 3. If the person moves towards the right of the monitored area, the execution module 104 may control the image capturing device 1 to move towards the right of the track system 3.

Figure 4A:
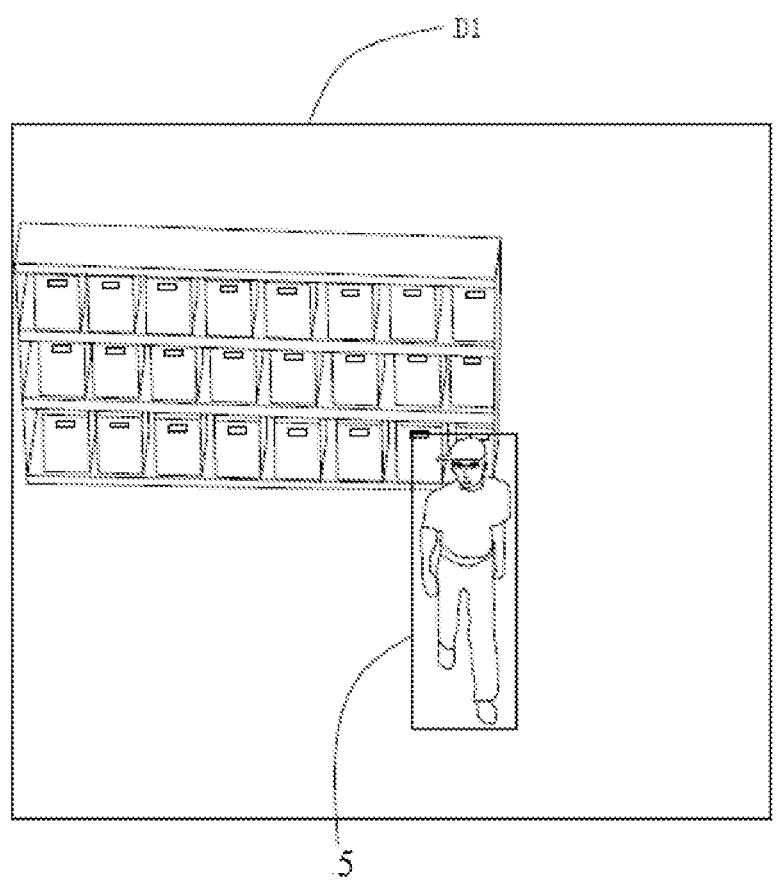
FIGS. 4A-4B are schematic diagrams of one embodiment of zooming in a lens of the image capturing device.
Figure 4B:
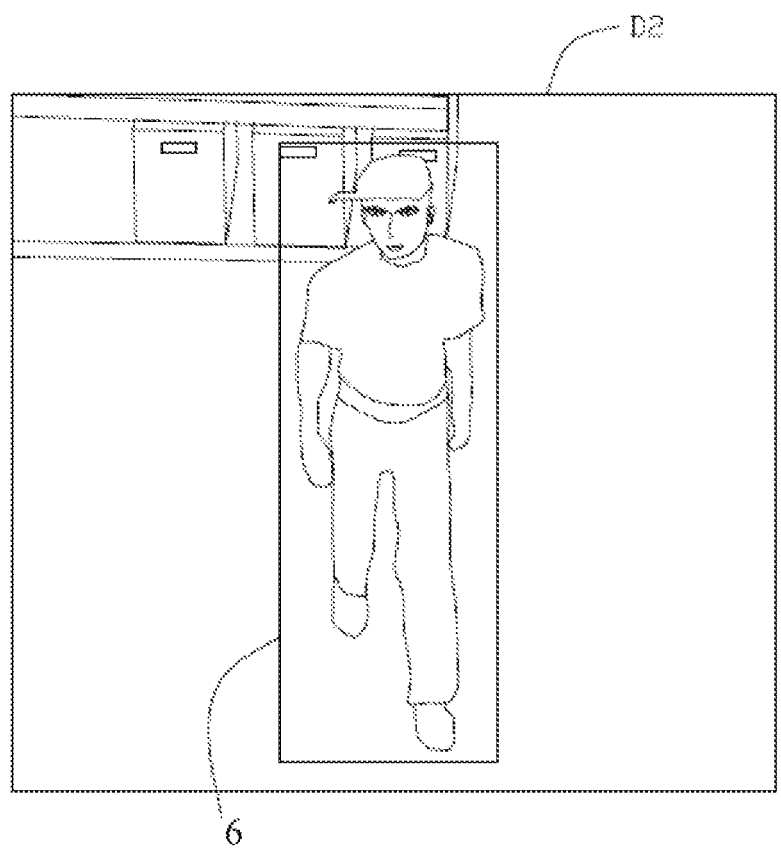

Referring to FIGS. 4A-4C, the image capturing device 1 moves from a first position "A1" to a second position "A2" along the track system 3 when a person 4 moves towards the right of the monitored area. Then, the image capturing device 1 further moves from the second position "A2" to a third position "A3" along the track system 3 when the person 4 further moves towards the right.

Figure 5:
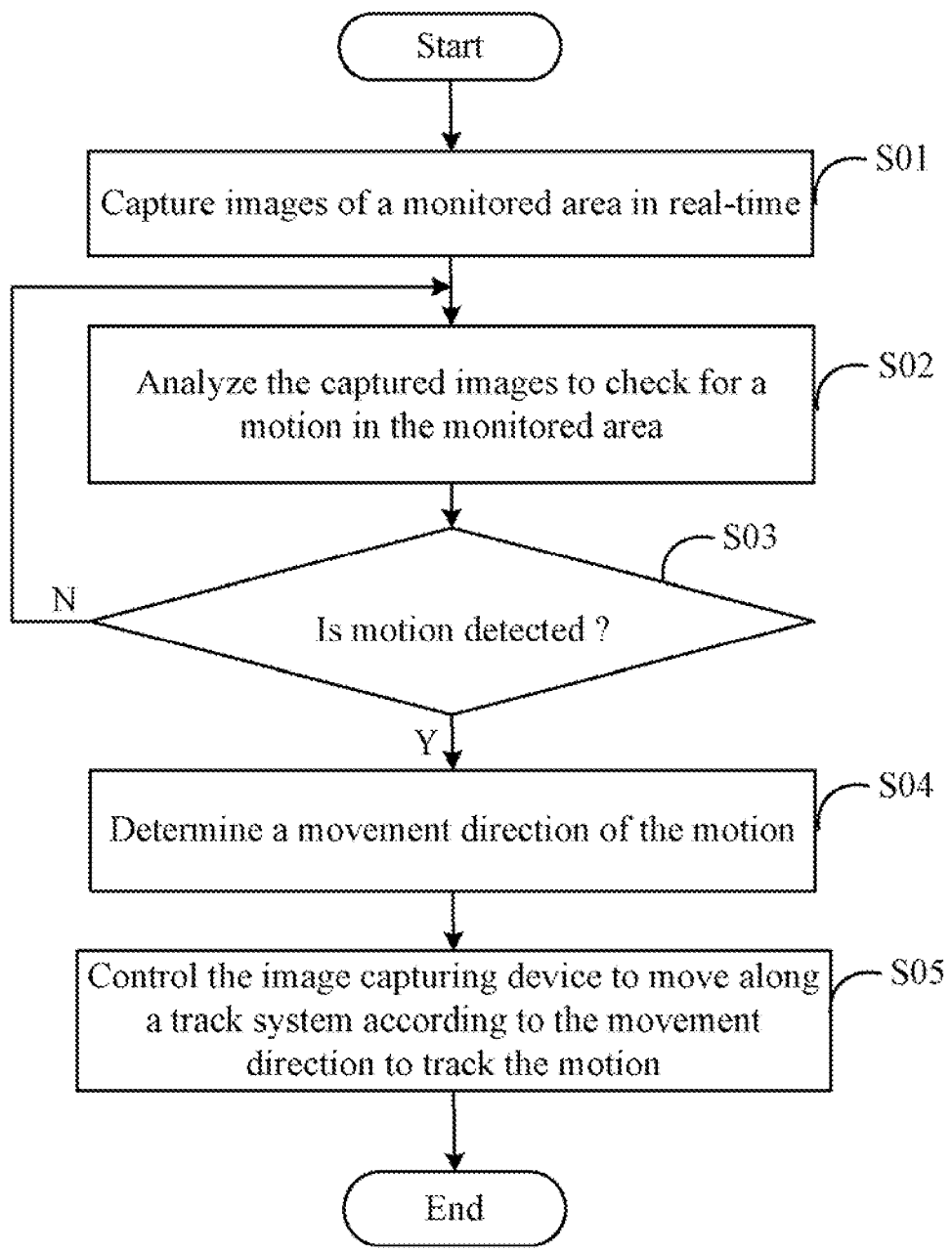
FIG. 5 is a flowchart of one embodiment of a motion tracking method using the image capturing device of FIG. 1.

FIG. 5 is a flowchart of one embodiment of a motion tracking method using the image capturing device 1 of FIG. 1. Depending on the embodiment, additional blocks may be added, others removed, and the ordering of the blocks, may be changed.

In block S01, the capturing module 101 captures images of the monitored area using the lens 10 in real-time. In the embodiment, the capturing module 101 may capture an image of the monitored area at regular intervals, such as, one second, or two seconds.

In block S02, the detection module 102 analyzes the captured images to check for motion in the monitored area. In block S03, the detection module 102 determines whether motion is detected in the monitored area. If motion is detected in the monitored area, block S04 is implemented. Otherwise, if no motion is detected in the monitored area, block S02 is repeated.

In block S04, the determination module 103 determines a movement direction of the motion. In the embodiment, the determination module 103 may determine the movement direction of the motion by comparing positions of the motion within two images of the monitored area that are consecutively captured by the lens 10.

In block S05, the extraction module 104 controls the image capturing device 1 to move along the track system 3 to track the motion using the driving device 11 according to the movement direction of the motion. Details of controlling the movement of the image capturing device 1 have been provided above.

In other embodiments, the detection module 102 further extracts a smallest rectangle enclosing the motion from a current image of the monitored area, and determines whether a ratio of the smallest rectangle within the current image is less than a preset value (e.g., 20%) after the image capturing device 1 has been controlled to move. If the ratio of the smallest rectangle within the current image is less than the preset value, the execution module 104 further controls the image capturing device 1 to pan and/or tilt the lens 10 until a center of the smallest rectangle is coincident with a center of the current image of the monitored area. In order to obtain a zoomed image of the motion, the execution module 104 further controls the image capturing device 1 to zoom in the lens 10 until the ratio of the smallest rectangle within the current image is equal to or greater than the preset value. As an example, referring to FIGS. 4A-4B, "D1" represents an image of the monitored area captured by the lens 10 when a person 4 is detected from the monitored area. "D2" represents another image of the monitored area captured by the lens 10 when the lens 10 is zoomed in.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A motion tracking method using an image capturing device, the image capturing device installed on a track system, the method comprising:

capturing images of a monitored area using a lens of the image capturing device in real-time;

analyzing the captured images to check for motion in the monitored area;

determining a movement direction of the motion when the motion is detected in the monitored area;

controlling the image capturing device to move along the track system to track the motion using a driving device according to the movement direction;

extracting a smallest rectangle enclosing the motion from a current image of the monitored area;

determining whether a ratio of the smallest rectangle within the current image is less than a preset value;

controlling the image capturing device to pan and/or tilt the lens until a center of the smallest rectangle is coincident with a center of the current image of the monitored area if the ratio of the smallest rectangle within the current image is less than the preset value; and controlling the image capturing device to zoom in the lens to obtain a zoomed image of the motion until the ratio of the smallest rectangle within the current image is equal to or greater than the preset value.

2. The method according to claim 1, wherein the motion is defined as movements of people in the monitored area.

3. The method according to claim 2, wherein the captured images are analyzed by using a template matching method that uses a neural network training algorithm or an adaptive boosting (AdaBoost) algorithm.

4. The method according to claim 1, wherein the movement direction of the motion is determined by comparing positions of the motion within two images of the monitored area that are consecutively captured by the lens.

5. The method according to claim 1, wherein the image capturing device is a speed dome camera or a pan/tilt/zoom (PTZ) camera.

6. An image capturing device for motion tracking, the image capturing device installed on a track system, the image capturing device comprising:

a lens, a driving device, at least one processor, and a storage system; and one or more programs stored in the storage system and being executable by the at least one processor, wherein the one or more programs comprises:

a capturing module operable to capture images of a monitored area using the lens in real-time;

a detection module operable to analyze the captured images to check for motion in the monitored area;

a determination module operable to determine a movement direction of the motion when the motion is detected in the monitored area;

an execution module operable to control the image capturing device to move along the track system to track the motion using the driving device according to the movement direction;

the detection module further operable to extract a smallest rectangle enclosing the motion from a current image of the monitored area, and determine whether a ratio of the smallest rectangle within the current image is less than a preset value; and the execution module further operable to control the image capturing device to pan and/or tilt the lens until a center of the smallest rectangle is coincident with a center of the current image of the monitored area if the ratio of the smallest rectangle within the current image is less than the preset value, and control the image capturing device to zoom in the lens to obtain a zoomed image of the motion until the ratio of the smallest rectangle within the current image is equal to or greater than the preset value.

7. The image capturing device according to claim 6, wherein the motion is defined as movements of people in the monitored area.

8. The image capturing device according to claim 7, wherein the captured images are analyzed by using a template matching method that uses a neural network training algorithm or an adaptive boosting (AdaBoost) algorithm.

9. The image capturing device according to claim 6, wherein the movement direction of the motion is determined by comparing positions of the motion within two images of the monitored area that are consecutively captured by the lens.

10. The image capturing device according to claim 6, wherein the image capturing device is a speed dome camera or a pan/tilt/zoom (PTZ) camera.

11. A non-transitory storage medium storing a set of instructions, the set of instructions capable of being executed by a processor of an image capturing device that is installed on a track system, causing the image capturing device to perform a motion tracking method, the method comprising:

capturing images of a monitored area using a lens of the image capturing device in real-time;
   analyzing the captured images to check for motion in the monitored area;
   determining a movement direction of the motion when the motion is detected in the monitored area;
   controlling the image capturing device to move along the track system to track the motion using a driving device of the image capturing device according to the movement direction;
   extracting a smallest rectangle enclosing the motion from a current image of the monitored area;
   determining whether a ratio of the smallest rectangle within the current image is less than a preset value;
   controlling the image capturing device to pan and/or tilt the lens until a center of the smallest rectangle is coincident with a center of the current image of the monitored area if the ratio of the smallest rectangle within the current image is less than the preset value; and
   controlling the image capturing device to zoom in the lens to obtain a zoomed image of the motion until the ratio of the smallest rectangle within the current image is equal to or greater than the preset value.

12. The storage medium as claimed in claim 11, wherein the motion is defined as movements of people in the monitored area.

13. The storage medium as claimed in claim 12, wherein the captured images are analyzed by using a template matching method that uses a neural network training algorithm or an adaptive boosting (AdaBoost) algorithm.

14. The storage medium as claimed in claim 11, wherein the movement direction of the motion is determined by comparing positions of the motion within two images of the monitored area that are consecutively captured by the lens.

15. The storage medium as claimed in claim 11, wherein the image capturing device is a speed dome camera or a pan/tilt/zoom (PTZ) camera.

* * * * *